Patented Nov. 4, 1941

2,261,784

UNITED STATES PATENT OFFICE 2,261,784

METHOD OF FORMING LAMINATED PRODUCTS

Thomas D. Thompson, Ridgefield Park, N. J., assignor to Stein, Hall & Company, Inc., New York, N. Y., a corporation of New York No Drawing. Application October 25, 1938, Serial No. 236,893

4 Claims. (Cl. 154—46)

The present invention relates to an adhesive and, more particularly, to an improved silicate adhesive suitable for use as a bonding agent in the manufacture of laminated products, such as corrugated paper board and the like.

It is an object of my invention to provide a novel silicate adhesive which is improved in its ability to form an initial bond, and also to retain its adhesive characteristics over long periods of time without developing brittleness.

It is a further object of my invention to provide a novel silicate adhesive that has a more desirable body and yet has the necessary viscosity and such other characteristics as are necessary to permit it to be used in conventional fabricating operations in standard plant procedure.

An additional object of my invention is to provide a new silicate adhesive that will not adhere tenaciously to hot metal surfaces as do ordinary silicate adhesives.

It is also an object of my invention to produce an adhesive that is sufficiently economical to compete with other adhesive products.

In accordance with the standard commercial practice of making a laminated fabric, such as corrugated paper board and the like, the fabrics to be laminated are combined in a continuous operation. The adhesive is applied to one piece of fabric by means of rollers or the like, and the bond between the laminations is usually formed with the assistance of heat and pressure. The applied pressure assists in the bonding action by providing intimate contact between the adhesive and the surface of the fabrics; the heat promotes evaporation of moisture from the adhesive which in turn increases the viscosity and setting of the adhesive. Too much heat may not be applied to assist in the bonding action because it will deleteriously affect the fabric, and only a slight amount of pressure may be used in many instances, such as making corrugated board, because of the danger of crushing the fabric. Consequently, it is often difficult to secure an intimate contact between the adhesive and the surfaces of the fabrics to be laminated. It will readily be seen that the selection of a suitable adhesive becomes extremely important, i. e., one which will have sufficient body to form a smooth even layer of bonding material between the laminations of fabric, and also form both an initial and a permanent bond without the use of undue heat or pressure.

While it is not essential that the initial bond so formed between the laminations of the fabric shall be in its final form and have its ultimate strength, because final setting of the bond may be accomplished during a reasonable storage period, nevertheless, it is particularly desirable that an adhesive to be used in the manufacture of paper board shall have the property of forming a relatively strong initial bond so that the board may be handled at once. When employing an ordinary silicate adhesive it is usually not possible or practical to effect more than a limited reduction of the moisture content of the silicate solution at the time of lamination, and since the adhesiveness in an ordinary silicate solution is developed through loss of water content, the initial bond may not be very strong. This is particularly true when the laminating apparatus is operated at desirable high speeds because the possible heating period is greatly curtailed. It will be evident, therefore, that it is desirable to employ an adhesive that will develop a high initial strength when employed under such high speed conditions, and it is such an adhesive to which my invention relates.

The bonding action of an adhesive results from its physical change, particularly in viscosity. When an adhesive gains in viscosity only through loss of water, it is obvious that conditions for evaporation or absorption of water must be present. Because high speed operations do not permit a large amount of evaporation, silicate adhesives that depend upon the evaporation of moisture therefrom to secure an increase in viscosity, therefore, are inferior to an adhesive that develops a bonding action upon a physical change due merely to increased temperature and without a material immediate evaporation of water. The most satisfactory bonding agent of the silicate type for the high speed production is one which acquires a pronounced increase in viscosity without the necessity of evaporating a large amount of water from the adhesive, and my invention comprises an adhesive that becomes sufficiently viscous to provide a good initial bond without a material reduction in moisture content by evaporation.

A further characteristic of a desirable adhesive is its ability to dry out or permanently set in a form that retains its adhesiveness. Inasmuch as laminated products, such as those made from corrugated paper-board, are usually subjected to numerous stresses under ordinary conditions of use, it is evident that the bonding material must possess sufficient resiliency and elasticity to avoid rupture or failure of the adhesive and the bond. Ordinary silicate adhesives are relatively brittle after being allowed to set. This hardness or lack of resiliency of the bond is a disadvantage in that the usual handling of the paper board product frequently results in breakage of the adhesive line. The adhesive state of a sodium silicate bond is dependent largely upon water of crystallization being retained therein. As a result of excess heating or even normal drying over an extended period of time, the moisture frequently is lost and the adhesive dries out as a hard white powder having no adhesive properties. Such "powdering out" is a usual cause of failure of the bond. The adhesive form of a silicate adhesive, as mentioned heretofore, is one that retains at least a part of the water of crystallization, and in accordance with my invention the silicate is enabled to retain more readily at least a portion of the water of crystallization so as to become less brittle.

Despite the careful control of laminating operations, a certain amount of an ordinary silicate adhesive dries on the rollers and other parts of a laminating machine and the dried adhesive is readily powdered to a form similar to that resulting from the "powdering out" action in a laminated product as described above. It will be appreciated that the hard silicate powder has an abrasive action on the moving parts of a machine and causes considerable wear. This is particularly noticeable on the bearings and other parts of the laminating machine. Similarly, when "powdering out" occurs in a finished product and the powder touches any packing apparatus, the latter also will be subjected to considerable wear and damage. By preventing or decreasing the powdering tendency of the silicate, in accordance with my invention, these disadvantages are minimized.

Another disadvantage inherent in ordinary silicate adhesives is their tendency to adhere to smooth polished metal surfaces in a hard, vitreous-like form, particularly when such surfaces are heated. As a result, deposits and ridges are formed on the pressure belts and rollers, causing undesirable scoring of the fabrics. Such deposits are removable only with difficulty and, consequently, frequent and costly shut-downs are necessary. This disadvantage is eliminated or greatly minimized when employing an adhesive in accordance with my invention.

Another characteristic that is essential in bonding agents of the type being considered is a viscosity that will permit the adhesive to be used in conventional processes such as the paper board process referred to above. The viscosity of the adhesive is somewhat critical in that it must be sufficient to permit the rollers to pick up the solution and at the same time the fluidity must be such that the adherence to the rollers will not prevent the transferring of the adhesive to the paper board. The adhesive made in accordance with my invention is one in which the desirable viscosity characteristics are not sacrificed and are such that it can be used in conventional operations in which known adhesives are now used, but to obtain the superior and desirable results described herein.

Soluble silicate of soda adhesives are in wide commercial use, but their disadvantages have led to a search for improvements. It has been proposed heretofore to add clay to a silicate adhesive, but clay is inert and any advantages are not particularly significant.

I have discovered that by incorporating a small amount of an amylaceous material in soluble silicate solutions of the above described type, an adhesive is obtained that has the properties and advantages heretofore described, and is especially useful for making corrugated board.

Solutions of sodium silicate having a density of from 32° to 40° B. are generally employed in the art and may be used in preparing my adhesive by adding an amylaceous material thereto. The proportion of silica to alkali in the silicate is not critical and, generally, any commercial grade will be satisfactory, if the viscosity is satisfactory, and the invention is applicable to any silicate capable of acting as a bonding agent.

The addition of the amylaceous material does not affect the desirable characteristics of the adhesive described above, such as its viscosity and the like. At ordinary temperatures the amylaceous material remains in the silicate solution as an inert material and does not appreciably affect the viscosity or other characteristics that make the silicate a useful adhesive.

The amylaceous material present in my improved adhesive acts as a filler and gives the adhesive and the bond more body. This materially reduces the weak points in the bond and insures a more uniform and complete adhesive layer between the laminations.

The amylaceous material in the adhesive, upon being heated with the silicate solution in the laminating process, swells and absorbs a large amount of moisture. The moisture is in effect removed from the silicate solution and held by and in the granules of amylaceous material, so that the silicate solution becomes more viscous at once, even though no water has been evaporated by heat. The adhesive acquires a drier appearance although the same total amount of moisture is present, and a good initial bond will be formed while the glue line is still visibly wet. It will be appreciated by those skilled in the art that this action will permit an increased rate of manufacturing the paper board product, and secure a better initial bond.

By amylaceous material I refer to any carbohydrate capable of swelling and absorbing water upon being heated, such as ungelatinized potato starch, corn starch, tapioca flour, and similar materials.

After the adhesive has fully set, the amylaceous material therein tends to retain water. Inasmuch as a satisfactory permanent bonding action of a silicate depends to a large extent upon the retention of water in the adhesive, as described above, it will be seen that this retention of moisture will assist in keeping moisture in the adhesive and minimize the undesirable "powdering out" of the adhesive. An examination of the bond formed by my improved adhesive shows that brittleness is substantially decreased and breakage of the bond upon handling of the board becomes highly unlikely.

Furthermore, my adhesive has less tendency to adhere to metal surfaces. Thus the difficulties experienced with respect to the formation of vitreous-like deposits on heated surfaces and the rollers is largely eliminated.

For the purposes of the present invention the addition of amylaceous material to an ordinary silicate may be made in a wide range of proportions. In general, quantities greater than one part to 6 parts of ordinary 40° B. silicate, while not harmful, do not exhibit a proportional increase in beneficial results, although larger amounts, such as 1 to 4 parts may be used. Quantities as small as 1 to 12 parts will provide an adhesive of improved characteristics. In the preferred embodiments, an adhesive suitable for the purposes intended will have a content of amylaceous material within the limits described above. However, it is not intended that the invention shall be limited to these proportions, inasmuch as the quantity of amylaceous material used can be varied over a wider range, depending upon the characteristics of the adhesive that are the most important in the use contemplated. In instances in which a large amount is used it may be necessary to add a slight amount of water to obtain the desired viscosity.

The method of mixing standard silicate adhesive and the amylaceous material is not of a critical nature. In many cases it will be preferred to add the amylaceous material to the silicate solution just prior to the time the final mixture is used in the laminating process. The addition may be made by the silicate manufacturer prior to the time the adhesive is shipped to the user. Some users purchase highly concentrated silicate solutions which must be diluted prior to use. In such cases, the proportion of amylaceous material to silicate solution would be greatly increased, so that upon dilution to the desired viscosity, the amylaceous material will be present in the adhesive in the proper proportion. Another method of making the addition to a heavy silicate solution is to form a suspension of the amylaceous material in water and use the same to lower the viscosity of the silicate.

It will be evident to one skilled in the art that the invention thus described may be varied within wide limits, and it is intended that all such variations within the scope of my claims are to be included within the scope of the invention.

I claim:

1. A method of forming laminated products which comprises applying to at least one of the laminae a soluble silicate solution of a concentration to function as an adhesive, and having added thereto ungelatinized starch in the proportion of one part to 4 to 12 parts of silicate, and then joining the laminae in the presence of heat sufficient to cause at least a partial hydration of the ungelatinized starch to form a strong initial bond retaining sufficient moisture in the adhesive line of the laminated product to preserve the elastic properties of the silicate adhesive bond over extended periods of time.

2. A method of forming laminated paper products which comprises applying to at least one of the laminae a soluble silicate solution having a specific gravity of 32°–40° B., and having added thereto ungelatinized starch in the proportion of one part to about 5 to 9 parts of silicate, and then joining the laminae in the presence of heat sufficient to cause at least a partial hydration of the ungelatinized starch to form a strong initial bond retaining sufficient moisture in the adhesive line of the laminated product to preserve the elastic properties of the silicate adhesive bond over extended periods of time.

3. A method of forming laminated paper products which comprises applying to at least one of the laminae a sodium silicate adhesive having added thereto ungelatinized starch in the proportion of 1 part to 5 to 9 parts of 40° B. silicate, and sufficient water to bring the mixture to the desired viscosity, and then joining the laminae in the presence of heat sufficient to cause at least a partial hydration of the ungelatinized starch constituent to form a strong initial bond, the gelatinized starch assisting in retaining moisture in the adhesive line of the said product in sufficient amount to preserve the relatively elastic properties of the silicate adhesive bond over extended periods of time.

4. A method of forming laminated paper products which comprises applying to at least one of the laminae sodium silicate adhesive having added thereto ungelatinized starch in the proportion of 1 part to 5 to 9 parts of 40° B. silicate and sufficient water to adjust the viscosity of the mixture to expedite application to the laminae, and then joining the laminae in the presence of heat and pressure sufficient to gelatinize the ungelatinized starch to increase the agglutinant properties of the silicate adhesive mixture and to accelerate the formation of a strong initial bond of low free moisture content, the gelatinized starch retaining moisture in the adhesive line of the said product in sufficient amount to maintain the tough, elastic properties of the silicate adhesive bond over extended periods of time.

THOMAS D. THOMPSON.